US007556854B2

(12) United States Patent
Farkas et al.

(10) Patent No.: US 7,556,854 B2
(45) Date of Patent: Jul. 7, 2009

(54) ADVANCED MULTI-PURPOSE BALLISTIC INSULATION

(75) Inventors: Tibor Farkas, Orange, CA (US); Todd E. Jensen, Oceanside, CA (US); Bich Nguyen, Rosemead, CA (US)

(73) Assignee: The Boeing Company, Chicago, IL (US)

( * ) Notice: Subject to any disclaimer, the term of this patent is extended or adjusted under 35 U.S.C. 154(b) by 97 days.

(21) Appl. No.: 10/669,980

(22) Filed: Sep. 24, 2003

(65) Prior Publication Data

US 2005/0085146 A1 Apr. 21, 2005

(51) Int. Cl.
*B32B 5/18* (2006.01)
*B32B 5/26* (2006.01)

(52) U.S. Cl. .............. 428/318.4; 428/319.3; 428/319.7; 428/911; 442/134; 442/135; 442/221; 442/224; 442/228; 442/232; 442/234; 442/235; 442/268; 442/370; 442/373; 442/376; 442/378; 442/381; 2/2.5; 89/36.01; 89/36.02; 89/36.05

(58) Field of Classification Search ................. 442/134, 442/135, 221–227, 228, 232, 234, 235, 268, 442/370, 373, 376, 378, 381; 428/304.4–322.7, 428/911; 2/2.5; 89/36.01, 36.02, 36.05
See application file for complete search history.

(56) References Cited

U.S. PATENT DOCUMENTS 3,381,420 A * 5/1968 Brink et al. .................. 52/2.14
6,187,411 B1 * 2/2001 Palmer ....................... 428/102
6,298,765 B1 10/2001 Dvorak
6,500,507 B1 * 12/2002 Fisher ....................... 428/36.1
2003/0037361 A1 * 2/2003 Steeghs et al. .................. 2/2.5
2004/0161989 A1 * 8/2004 Dennis et al. ............... 442/135

OTHER PUBLICATIONS http://www.sri.com/oulter/air_safety/reports.html.
Donald A. Shockey, David C. Erlich, and Jeffrey W. Simons, Lightweight Fragment Barriers For Commercial Aircraft, 18th International Symposium On Ballistics, San Antonio, Texas, Nov. 15-19, 1999, pp. 1192-1199.
Donald A. Shockey, David C. Erlich, and Jeffrey W. Simons, Full-Scale Tests Of Lightweight Fragment Barriers On Commercial Aircraft, DOT/FAA/AR-99/71, Nov. 1999, 10 pgs., US Dept. Of Transportation Federal Aviation Administration, Washington, D.C.
Donald A. Shockey, Jeffrey W. Simons, and David C. Erlich , Improved Barriers to Turbine Engine Fragments: Interim Report I, DOT/FAA/AR-99/8, I, Jun. 1999, 40 pgs., US Dept. Of Transportation Federal Aviation Administration, Washington, D.C.

(Continued)

*Primary Examiner*—Ula C Ruddock
(74) *Attorney, Agent, or Firm*—Alston & Bird LLP

(57) ABSTRACT

An insulation package comprising a layer of material having a cellular structure disposed between a first layer of high-strength polymeric fabric and a second layer of high-strength polymeric fabric. The insulation provides protection for critical fluid systems, such as fuel, hydraulic, electrical, pneumatic, thermal, and mechanical systems from high-energy projectiles such as fragments from the disintegration of high-speed turbines and engines.

22 Claims, 3 Drawing Sheets

14
20
14

OTHER PUBLICATIONS

Donald A. Shockey, Jeffrey W. Simons, and David C. Erlich , Improved Barriers to Turbine Engine Fragments: Interim Report II, DOT/FAA/AR-99/8, II, May 1999, 24 pgs., US Dept. Of Transportation Federal Aviation Administration, Washington, D.C.

Donald A. Shockey, David C. Erlich, and Jeffrey W. Simons, Improved Barriers to Turbine Engine Fragments: Interim Report III, DOT/FAA/AR-99/8, III, May 2001, 94 pgs., US Dept. Of Transportation Federal Aviation Administration, Washington, D.C.

Donald A. Shockey, David C. Erlich, Jeffrey W. Simons, and Hyung-Seop Shin, Improved Barriers to Turbine Engine Fragments: Interim Report IV, DOT/FAA/AR-99/8, IV, Jun. 2002, 52 pgs., US Dept. Of Transportation Federal Aviation Administration, Washington, D.C.

Donald A. Shockey, David C. Erlich, and Jeffrey W. Simons, Improved Barriers to Turbine Engine Fragments: Final Report, DOT/FAA/AR-99/8, V, Jun. 2002, 42 pgs., US Dept. Of Transportation Federal Aviation Administration, Washington, D.C.

J. W. Simons, D. C. Erlich and D. A. Shockey, Finite Element Design Model For Ballistic Response Of Woven Fabrics, SRI International, 9 pgs.

* cited by examiner

ADVANCED MULTI-PURPOSE BALLISTIC INSULATION

FIELD OF THE INVENTION

The invention relates to insulation for protection of various components, such as fuel and hydraulic components, from high velocity projectiles. More particularly, the invention relates to insulation that may be applied to critical fluid systems of a vehicle such as fuel, hydraulic, pneumatic, and thermal systems of a vehicle.

BACKGROUND OF THE INVENTION

Vehicles, such as aircraft, spacecraft, and automobiles often have critical hydraulic, pneumatic, fuel, thermal, electrical, or mechanical systems positioned within close proximity of on-board turbines or high-speed engine components. In the event of structural failure of a turbine or engine, it is possible that the high-speed components of the turbine or engine may become high-energy projectiles, and that such projectiles may damage critical systems of the vehicle.

By way of example, automobiles often contain brake lines, fuel lines, and electrical cables located in close proximity to the main engine of the automobile. Upon structural failure of the engine, it is possible that components of the engine may become high speed projectiles and may damage one or more of the brake, fuel, or electrical lines. Further, it is possible that a high-energy projectile may be introduced into the passenger compartment through the fire wall of the automobile.

By way of another example, spacecraft such as the Space Shuttle contain several turbine driven components and, although the likelihood of turbine failure is minimal, consequences of a structural turbine failure aboard a spacecraft are particularly serious. For instance, the Space Shuttle contains Auxiliary Power Units (APUs), Solid Rocket Booster Hydraulic Power Units (HPUs), and Space Shuttle Main Engine (SSME) Turbo Pumps, each of which comprise high speed turbines in close proximity to safety critical pneumatic, thermal, fuel, or hydraulic components.

The APUs aboard the Shuttle are of particular interest when examining the possible consequences of turbine failure. Each APU is a hydrazine-fueled, turbine-driven power unit that generates mechanical shaft power to drive a hydraulic pump that produces pressure for the orbiter's hydraulic system. Aboard the Shuttle, there are three separate APUs, three hydraulic pumps and three hydraulic systems.

The turbines of the APUs are designed for operation between 74,160 rpm to 82,800 rpm. In the event of an APU overspeed event or other structural failure of the turbine, it is possible that the APU hydrazine tanks could be damaged by fragments of the turbine. Fragments of the turbine could also damage hydraulic lines that are critical for control or operation of the Shuttle.

Critical systems of spacecraft, and vehicles in general, are conventionally protected with thermal and acoustic insulation. The thermal insulation provides protection from environmental temperature variations, while the acoustic insulation provides protection from external vibrations. But, conventional thermal and acoustic insulation systems do not provide protection from high-energy projectiles, such as those produced upon failure of high-speed engines or turbines.

It is desired to provide critical fluid systems of aircraft, spacecraft, and automobiles, as well as other vehicles, machinery, and equipment having high speed turbines or engines with a protective system capable of protecting the critical systems from impact by high-energy projectiles. It is further desired to provide protection from projectiles while providing any thermal or acoustic protection desired for operation of the critical systems.

SUMMARY OF THE INVENTION

The invention is an insulation package comprising a ballistic fabric combined with a cellular material that may be opened-cell or closed-cell. The insulation may optionally be combined with additional thermal, acoustic, ballistic, hypervelocity impact resistant, and radiation resistant layers. The insulation is preferably flexible enough to conform to the irregular shape of underlying components when installed thereon and is, at the same time, strong enough to protect the underlying components from penetration by high-energy projectiles.

The insulation comprises a first layer of high-strength polymeric fabric, a layer of material having a cellular structure disposed upon the first fabric layer, and a second layer of high-strength polymeric fabric disposed upon said cellular material. The fabric layers is woven of high-strength polymeric fibers that may be selected from the group consisting of aramids, polyethylenes, and polybenzazoles, and interwoven combinations thereof. The cellular material may be selected from the group consisting of close-celled polymer foams, open-celled polymer foams, open-celled aerogels, and open-celled graphitic foams.

The insulation is used to protect components of critical fluid systems, such as fuel, hydraulic, electrical, pneumatic, thermal, and mechanical systems, from damage by high-energy particles, including ballistic particles, shrapnel from explosive events, fragments from high-speed turbine disintegration, and projectiles from high-speed engines. The insulation package may be utilized to protect the critical systems of land based equipment, land vehicles, ships, aircraft, and spacecraft.

The particular types of ballistic, thermal, and acoustic insulation layers, the thickness and density of the layers, and the physical arrangement of the layers are advantageously customized depending on the predicted end use of the insulation. The arrangement and properties of the layers are chosen such that the resulting blanket, when installed, provides the underlying critical component with adequate protection from ballistic projectiles, from thermal and acoustic sources, and from hypervelocity particles, if any.

Ballistic resistance is provided by multiple layers of a woven, polymeric "bulletproof" material or combination of materials, such as layers of multi-ply woven aramids, polyethylenes, and polybenzazoles (PBZs). The ballistic material protects the critical systems from projectiles which could impact the insulation at speeds of 1,000 ft/sec to 3,000 ft/sec. These impact speeds translate to an impact energy of about 1,600 to about 31,000 ft-lbs.

The ballistic layers are separated and may also be surrounded and/or impregnated with a cellular material such as a foam or aerogel. The cellular material acts as a further thermal insulation component to the insulation package. The thin walls, and small cell size of the cellular materials inhibit the transmission of heat through the thickness of the package. Closed-cell foams and aerogels provide improved insulation. Opened-cell foams allow the insulation to breath. Breathability is important in environments where environmental pressure varies during use of the package, such as during launch and reentry of a space vehicle.

The insulation also behaves as a hypervelocity impact resistant package due to the ballistic fabric layers being spaced apart from one another with the cellular material disposed between the fabric layers. The ballistic fabric layers act as shocking layers and the cellular material acts as an absorption layer, where at least one shocking layer and at least one absorption layer are positioned such that the any hypervelocity particles impact the shocking layer (fabric layer) prior to passing through the absorption layer (cellular layer). In operation, the hypervelocity particle impacts the shocking layer and is fractured by the large energies created by collision with the shocking layer. Fragments and debris from the hypervelocity particle pass through the shocking layer and are absorbed into the underlying absorption layer. The invented insulation is designed to mitigate potential damage from man-made space debris or micrometeorites traveling at velocities of 10,000 ft/sec to 20,000 ft/sec.

The insulation may optionally be layered with additional insulation components, such as additional thermal layers, acoustic insulation layers, emissivity layers, or supplemental hypervelocity subsystems.

By providing an insulation system which combines thermal and acoustic insulating properties with protection from ballistic projectiles, the insulation is uniquely suited for use with critical systems that could otherwise be damaged by shrapnel from the disintegration of a high-speed turbine or some other high-energy projectile. Further, the unique arrangement of components provides resistance to hypervelocity impact provides added protection for fuel and hydraulic systems aboard space vehicles exposed to space debris and micrometeoroids.

BRIEF DESCRIPTION OF THE DRAWINGS

Figure 1:
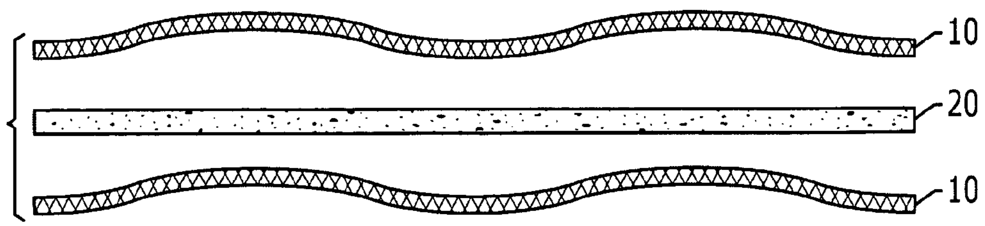
Figure 2:
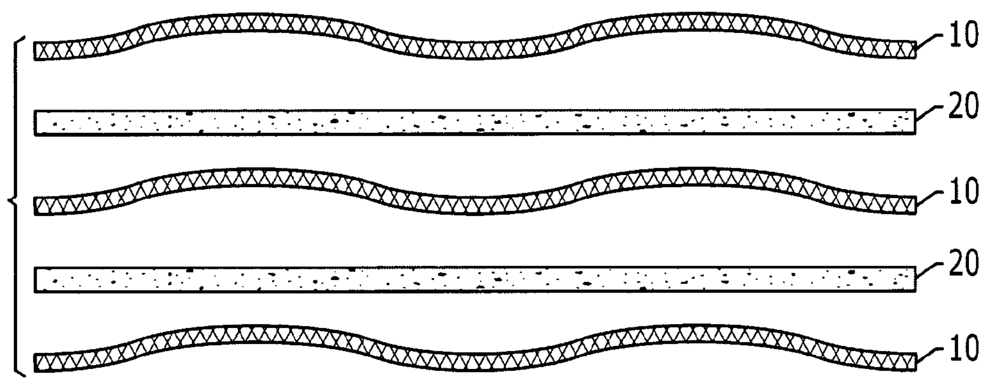
Figure 3:
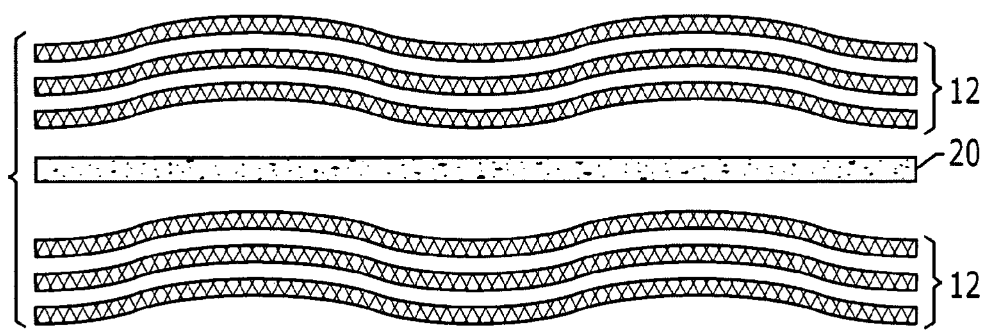
Figure 4:
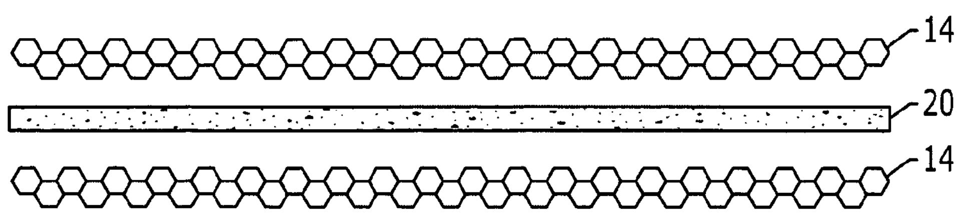
Figure 5:
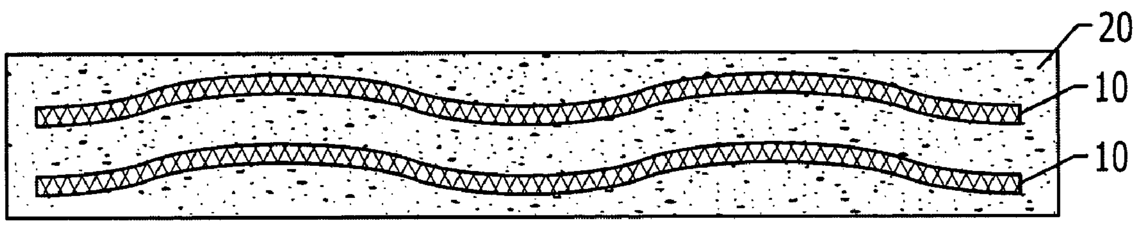
Figure 6:
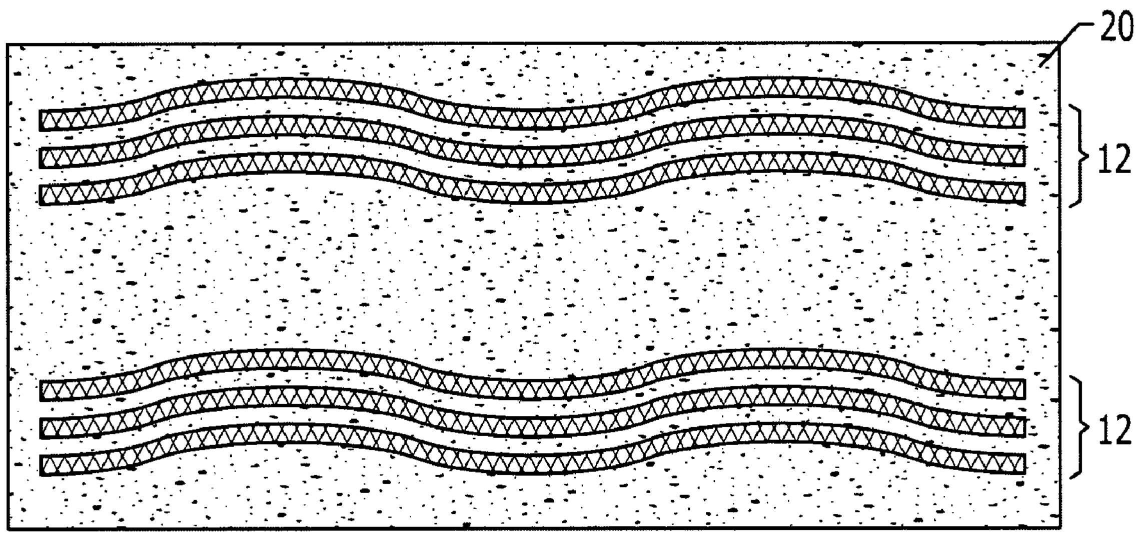
Figure 7:
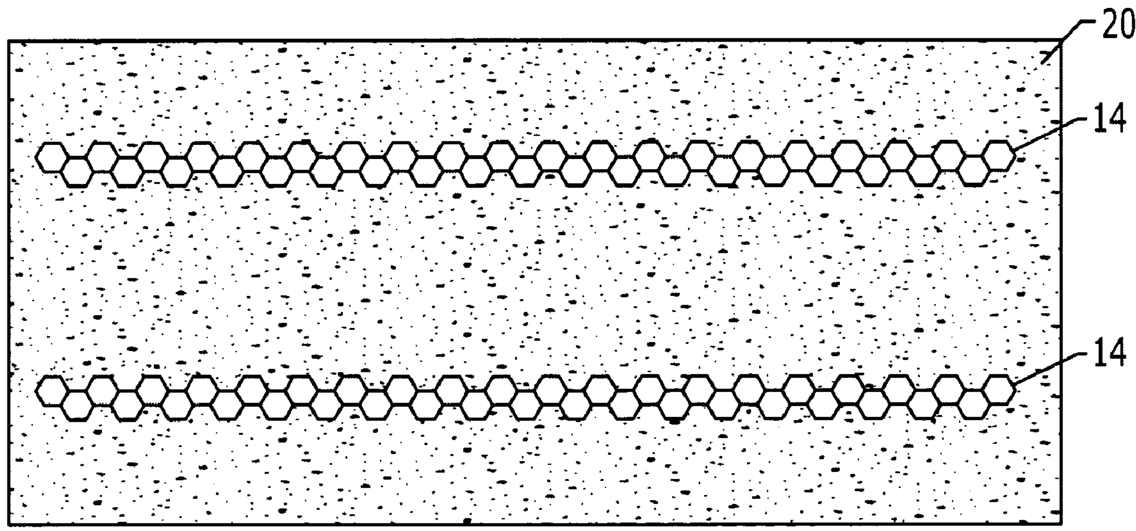
Figure 8:
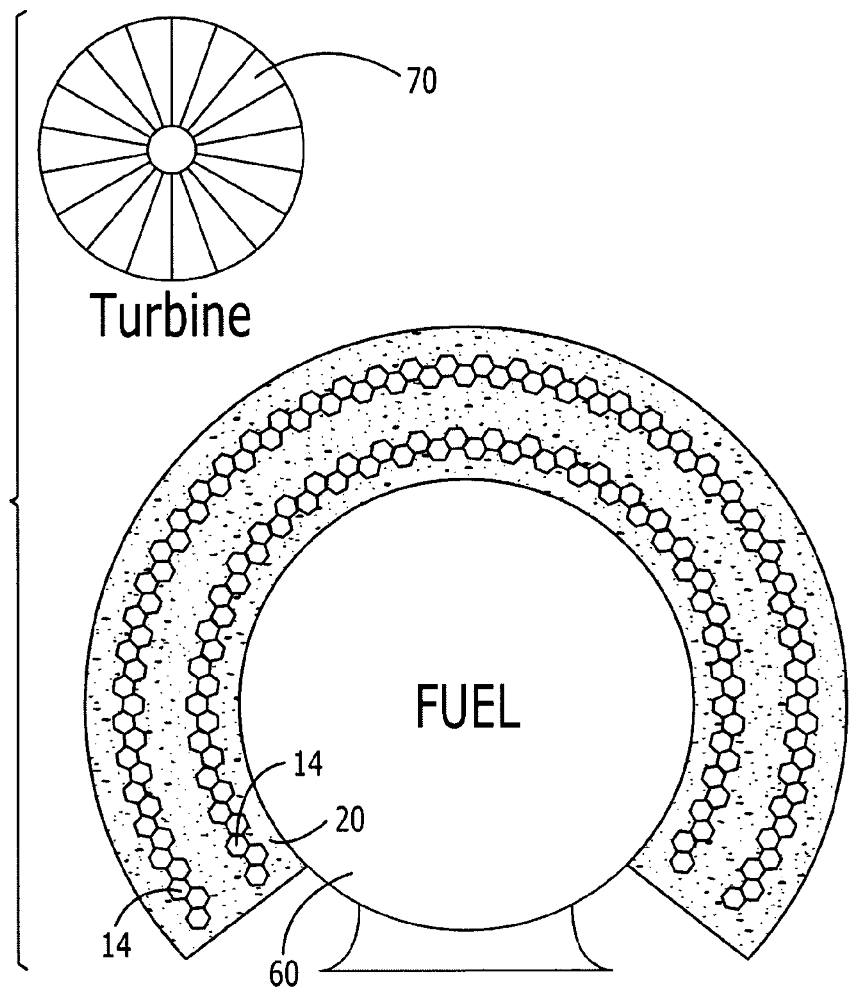
Figure 9:
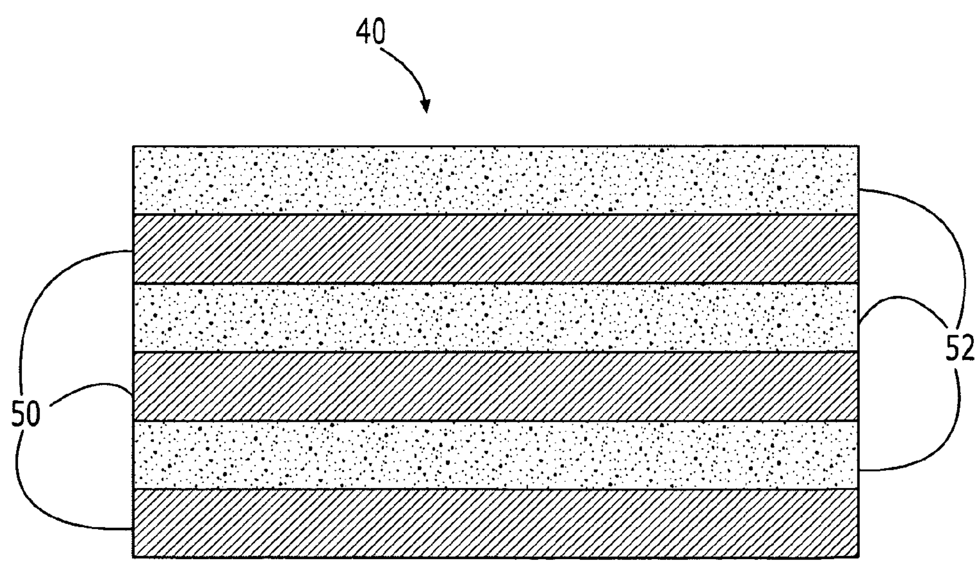

Having thus described the invention in general terms, reference will now be made to the accompanying drawings, which are not necessarily drawn to scale, and wherein:

FIG. 1 is a cross-sectional view of multi-purpose insulation in accordance with one embodiment of the invention;

FIG. 2 is a cross-sectional view of multi-purpose insulation in accordance with another embodiment of the invention;

FIG. 3 is a cross-sectional view of multi-purpose insulation in accordance with yet another embodiment of the invention;

FIG. 4 is a cross-sectional view of multi-purpose insulation in accordance with an embodiment of the invention utilizing fabric layers arranged in a honeycomb cross-section;

FIG. 5 is a cross-sectional view of multi-purpose insulation in accordance with still yet another embodiment of the invention;

FIG. 6 is a cross-sectional view of multi-purpose insulation in accordance with again yet another embodiment of the invention;

FIG. 7 is a cross-sectional view of multi-purpose insulation in accordance with a second embodiment of the invention that utilizes fabric layers arranged in a honeycomb cross-section;

FIG. 8 is a cross-sectional view of multi-purpose insulation installed upon a fuel tank with respect to a turbine, in accordance with another embodiment of the invention; and FIG. 9 is a cross-sectional view of a hypervelocity resistant layer in accordance with another embodiment of the invention.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Referring to FIG. 1, according to one embodiment, a laminate structure is formed by disposing a cellular layer 20 between two layers of woven polymeric fabric 10. The laminate is then compressed to form a unitary structure. The laminate may be held together by adhesives or stitching, or the layers may be held together by an external covering such as a fabric sheath. Referring to FIG. 2, the layering of fabric layer 10 and cellular layer 20 may be repeated as many times as are necessary to protect the insulated object. The outer most layer on either side of the laminate structure may be either a fabric layer 10 or a cellular layer 20.

Referring to FIG. 3, according to another embodiment, the laminate is assembled as demonstrated in reference to FIG. 1 above, but each fabric layer 12 is composed of multiple plies of woven fabric. Referring to FIG. 4, according to yet another embodiment, multiple layers of woven fabric are manipulated and formed into a structure 14 having a honeycomb cross-section. The honeycomb structure 14 is then layered with the cellular material 20. The cellular material 20 may infiltrate the honeycomb structure 14, or the voids formed within each individual honeycomb may remain empty. If the voids formed within the honeycomb structure are filled with a cellular material, the cellular material may be the same are different than the cellular material comprising the matrix 20 surrounding the woven layers.

Referring to FIG. 5 according to yet another embodiment, the two of more layers 10 of woven fabric may be completely disposed in a matrix of cellular material 20. The cellular material 20 may or may not infiltrate the fabric of the layers 10, and the fabric layers 10 may contact one another or may be overlying but spaced apart from one another and held in place by the matrix 20. Referring to FIG. 6, the fabric layers may advantageously be formed into discrete bundles 12, or closely spaced layers, evenly spaced about a cellular matrix 20.

Referring to FIG. 7, according to still another embodiment, multiple layers of woven fabric are manipulated and formed into a structure 14 having a honeycomb cross-section, and the honeycomb structure 14 is imbedded in a matrix 20 of cellular material. The cellular material may infiltrate the honeycomb structure 14, or the voids formed within each individual honeycomb may remain empty. If the voids of the honeycomb structure are filled, the cellular material used to fill the honeycombs may be the same or different than the cellular material comprising the matrix 20 surrounding the honeycomb layers 14.

Referring to FIG. 8, an embodiment of the insulation is shown installed upon a fuel tank 60 positioned proximate to a high-speed turbine 70. The insulation is shown having woven fabric honeycomb layers imbedded in a cellular matrix, but any of the embodiments described herein could be applied to the tank 60 in like manner.

An example of the fuel tank 60 is a hydrazine fuel tank 60 aboard a Space Shuttle Orbiter. For exemplary purposes, the fuel tank is shown as positioned with respect to a high-speed APU turbine 70. During normal operation of the APU, the thermally insulating properties of the fabric layers 14 and the cellular matrix 20 helps to prevent the APU system from dropping below 45° F., to prevent the hydrazine fuel from freezing and to maintain required lube oil viscosity. The thermal properties of the insulation also minimize electrical heater power requirements. The cellular matrix 20 attenuates acoustic vibrations generated by the Shuttle during lift off and space flight. The majority of acoustic energy results from the solid rocket boosters. The combined properties of the high-strength polymeric woven fabric 14, and the matrix 20 allow the insulation to withstand impact of projectiles resulting from turbine disintegration.

The ballistic component of the insulation is two or more layers of a woven high-strength polymers that may be selected from the group consisting of polyaramids, polyethylenes, polybenzazoles, and interwoven combinations thereof. Preferred polymers are poly(p-phenylene terephthalate)s such as Kevlar™ fibers, poly(m-phenylene isophthalate)s such as Nomex™ fibers, or polybenzazole (PBZ) fibers. Each polymeric fabric layer may be independently comprised of any of the above described ballistic materials. Alternatively, the layers of ballistic insulation may comprise an interwoven combination of any of the above described ballistic materials.

The required strength, thickness, and number of plies of ballistic insulation will vary with the desired use of the insulation blanket. For example, for use on a commercial aircraft, it is desired that the combination of ballistic layers be able to resist penetration when impacted with a fragment having a kinetic energy greater than about 3500 ft-lbs. For use on an auxiliary power unit (APU) fuel tank aboard the Orbiter, it is desired that the combination of ballistic layers be able to resist penetration when impacted with a fragment having a kinetic energy greater than about 1700 ft-lbs, and resistance to greater than about 3500 ft-lbs is desirable as a safety factor.

For protection against micrometeorites, the combination of ballistic layers must cause the self-destruction of a particle flying at greater than 20,000 ft/sec, with a size less than 1 cm in diameter and weight of less than 3 grams. Man-made orbital debris may be larger and heavier than typical micrometeorites, but flies at a lower velocity. Again, it is important to combine the proper elements required for the application.

The fabric layers 10 are either coarsely woven or heavily woven. When used to form insulation which will be used under relatively constant atmospheric conditions, it is preferable that heavily woven fabric layers be used for maximum strength. When used to form insulation which may be used under dynamic pressure conditions, such as aboard space vehicles, coarsely woven fabric layers are preferred, since the coarsely woven layers allow the insulation to breath and to equilibrate the pressure within the blanket with that of the surrounding atmosphere. A fabric having less than about 1% openness is considered a heavily woven fabric, a fabric having greater than about 2% openness is considered a coarsely woven fabric, and a fabric having from about 1% to 2% openness may be considered coarsely woven or heavily woven, but is generally considered coarsely woven.

The term "polybenzazole" as used herein refers to various fibers made of polybenzazole (PBZ) polymers. Examples of the polybenzazole (PBZ) polymer include polybenzoxazole (PBO) and polybenzothiazole (PBT) homopolymers, as well as random, sequential or block copolymers of their monomer components.

The polybenzoxazole and polybenzothiazole, as well as random, sequential or block copolymers of their monomer components, are disclosed in, for example, U.S. Pat. Nos. 4,703,103; 4,533,692; 4,533,724; 4,533,693; 4,359,567; and 4,578,432. The PBZ polymers are lyotropic liquid crystal polymers which are composed of homopolymers or copolymers containing, as the main base unit, at least one selected from the units depicted by the structural formulas (a) to (h):

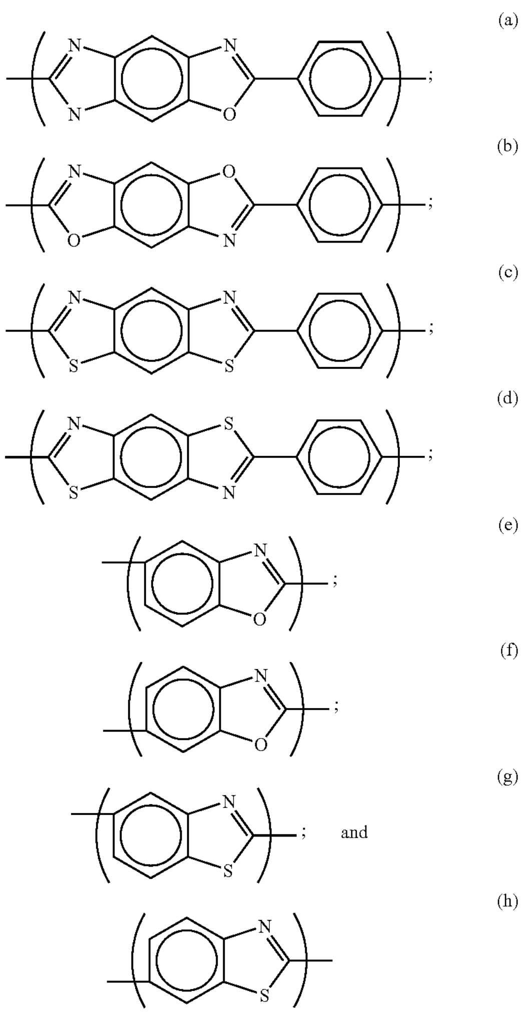

The PBZ polymers and copolymers can be produced by any of the known methods, such as disclosed in U.S. Pat. No. 5,089,591. The PBZ polymers and copolymers may be made into polybenzazole fibers with high temperature resistance, high tensile strength, and high tensile modulus by known methods such as that shown in U.S. Pat. No. 5,294,390. An exemplary PBZ fiber is Zylon™ fiber, a poly(p-phenylene-2,6-benzobisoxazole), produced by Toyobo Co., Osaka, Japan.

By way of example, 3500 ft-lbs of ballistic resistance may be obtained by combining 3 layers of Zylon™ fabric, with each layer having a pitch of 30 to 45 ypi, a thickness of about 0.15 to about 0.27 mm, and a density of about 0.80 to about 0.87 g/cm$^3$.

The cellular material of the invention is selected from open or closed cell structures having rigid or flexible foam properties. More particularly, the preferred cellular materials are selected from close-celled polymer foams, open-celled polymer foams, open-celled aerogels, and open-celled graphitic foams.

In general, closed-cell foams and the aerogels are used in insulation packages that will not be exposed to substantial changes in external atmospheric pressures. Closed-cell foams and aerogels are preferred because the close-celled foams generally have greater insulating capacity than similar open-celled foams. Open-celled foams are preferred for situations in which atmospheric pressure may change substantially during use of the insulation, such as during the accent and reentry of a space vehicle.

Closed cell polymeric foams are preferably used as the cellular material when temperatures experienced by the insulation will not exceed the decomposition temperatures of the foam and when the insulation will not experience large variations in atmospheric pressure. Such closed cell foams may be chosen from blown polyurethane foams. The closed cell foams may be formed as a matrix around the layers or just laminated between the layers.

Aerogels are low density, high porosity substances having extremely small pore diameters. The aerogels encompassed by this invention have porosities greater than 60% and densities from about 1.0 $lbs/ft^3$ to about 10 $lbs/ft^3$. Because the pore diameters of the aerogels are close to or less than the mean free path of air molecules, the aerogels prevent the conduction of heat via air through the insulative material. The aerogel is preferably formed by infiltrating an aerogel precursor into or around the fabric layers after the precursor has had an opportunity to age and gel. The precursor is then dried into its highly porous cellular structure.

For a silica aerogel, the precursor is an alkoxysilane, preferably TMOS (tetra-methoxy silane, $Si(OCH_3)_4$) or TEOS (tetraethoxysilane, $Si(OCH_2CH_2)_4$) mixed with an alcohol, preferably methanol or ethanol, water, and a base catalyst such as ammonium hydroxide. The percentage of components is varied to obtain a desired density of aerogel. Typical percentages for the aerogel precursor composition are about 5 wt % to about 25 wt % alkoxysilane, about 50 wt % to about 85 wt % alcohol, about 5 wt % to about 20 wt % water, and ammonium hydroxide dissolved in the water component at a concentration of about 0.01 to 10 moles per liter of water.

For an alumina aerogel, the precursor is a mixture of an aluminum alkoxide, preferably tri-sec-butoxide, an alcohol, which is preferably a mixture of ethanol and methanol, water, and an acid catalyst such as acetic acid. A typical mixture is composed of about 15 to 25 wt % aluminum tri-sec-butoxide, about 70 to 80 wt % alcohol, about 1 wt % deionized water, and about 5 wt % acetic acid.

The aerogel precursor is allowed to age and gel, after which the gelled precursor is applied to the fabric layers of the insulation. The gel may be sprayed, brushed, or poured upon the fabric, or the fabric may allowed to soak in the gel material. Alternatively, the aerogel may be introduced into the fabric by vacuum bagging the fabric layers and introducing the gel into the bagged container until the gel infiltrates the fabric. After infiltration, the aerogel is dried by heat or purge.

The dried aerogel material substantially occupies the voids between the fibers of the woven fabric and between the individual layers of fabric, if several layers were treated with the aerogel. The aerogel is loosely bonded to individual fibers. The aerogel material, which is nanoporous with a porosity typically between 70% and 90%, prevents the transmittance of heat through the voids in the fabric layer, significantly lowering the thermal conductivity of the overall insulation material.

In cases in which the insulation is formed from laminated layers of woven fabric and cellular material, i.e. where the cellular material does not impregnate the fabric material, the cellular material may be an open-celled graphitic foam. Graphitic foam is an ultra-stiff, ultra-lightweight structural material formed from carbon mesophase pitch. The graphitic foam is advantageous because it has a microcellular structure that provides strength through all axes, and because the three dimensional cellular structure of the foam provides favorable insulative characteristics.

The graphitic foam is favorable for use aboard vehicles that travel to space because the open-celled structure of the foam allows gaseous movement through the foam, thus allowing decompression of the insulation as the insulation enters space, and recompression of the insulation as the insulation re-enters the atmosphere.

In addition to the ballistic resistant fabric layers and the cellular material of the insulation, the insulation may comprise additional layers of material designed to enhance the thermal, acoustic, or radiation control characteristics of the insulation. Such additional layers are added as circumstances demand and do not alter the effectiveness of the insulation as a thermal insulation as well as a protective mechanism for limiting penetration of projectiles.

A radiation control layer acts to reflect externally generated radiation away from the insulation and the protected component, and also to return radiation such as heat to the protected component. The radiation control layer may also double as a cover member which encapsulates insulation and maintains the integrity of the insulation. Such radiation control layer is preferably formed of a thin film, such as a thin metal film or aluminized polyester film. One or more layers of Beta Cloth™ glass fiber material may optionally be used with radiation control layer in order to physically protect the insulation. Beta Cloth™ material is commonly used in the spacecraft applications industry, and is relatively inert in a space environment and is also highly resistant to space degradation.

The invented insulation has a degree of resistance to hypervelocity attack inherent in its structure. The multiple layers of ballistic fabric that are infiltrated or laminated with at least one layer of cellular material provide a multi-shock system which acts to prohibit hypervelocity particles from passing through the insulation. However, if added protection from hypervelocity particles is desired, dedicated hypervelocity insulation components may be used in conjunction with the insulation.

Referring to FIG. 9, an additional hypervelocity resistant layer 40 may comprise a multi-shock hypervelocity assembly 40 including a plurality of sandwiched multi-shock subassemblies having multiple ballistic layers 52 layered with multiple absorption layers 50. Such a multi-shock configuration is disclosed in U.S. Pat. No. 6,298,765, incorporated herein by reference. The multi-shock assembly is designed to produce the successive impact shocking of an impacting particle and its resulting particulate fragments such that all of the material of which the original impacting particle is comprised is raised to the higher thermal state of total molten condition and/or vaporization as will preclude a puncture of the protected object.

Additional thermal components may be added to the invented insulation. A thermal component is one or more layers of thermal insulation that provide protection from extremely cold or warm environments. The thermal component is preferably one or more layers of woven fiber. Examples include polyester and glass. The one or more layers may be a particular fiber or may be a combination of interwoven fibers. For instance, for space based applications, the insulation component will typically be a space-rated fabric layer capable of maintaining devices within their operational temperatures even when exposed to the extreme cold of space. As another example, the added thermal layer may find use on turbine driven aircraft, or in land vehicles, equipment, or machinery having turbines or similar high-speed mechanical parts, in which case the added thermal component may be designed to protect the insulated part from extremely high temperatures.

An exemplary insulation layer used for space applications is TG15000™ insulation, available from Hi Temp Insulation, Inc., Camarillo Calif. TG15000™ insulation is a fibrous blanket which can be manufactured in slabs, sheets, or molded shapes. It is made of glass fibers and a silicone resin binder and can withstand temperatures of −300 to +700° F. It comes in 1, 3, and 6 lb/$ft^3$ densities, and is primarily used for thermal control of components by minimizing their exposure to environments, and providing retention of heat between the components and inner surface of the blanket. For use on an APU, thermal insulation preferably provides the overall insulation with a conductivity value from about 0.02 to about 0.03 Btu/(hr)($ft^2$)(° F./ft).

Examples of non-space thermal insulation are rigid closed cell foam, or foam typically used to insulate cryogenic pipes, or a felt blanket with no venting provisions.

The invented insulation is self-contained and can be attached to objects in need of protection from high velocity projectiles. Because the insulation is flexible, it may be easily applied to a wide variety of surfaces and in a wide variety of configurations. Attachment points may be attached directly to any or all of the insulation layers or may be attached to a covering surrounding the insulation. The insulation may be attached to protected objects with, for example, snap attachment elements, strap attachment elements, or hook and pile fastening attachment elements.

The invented insulation may be utilized in a wide variety of applications because the material combination and the construction order of the blanket may be varied depending upon the desired resulting thermal, acoustic, and ballistic protection.

The insulation provides excellent protection against penetration by ballistic particles because of the fabric layers woven of high-strength polymeric materials. The insulation is also effective against hypervelocity particles because the multiple layers of fabric are spaced apart from one another by a cellular material such that the fabric and cellular material work together by impacting and disintegrating any hypervelocity particles. In the event of impact by a hypervelocity particle, the upper most fabric layer is perforated while shocking the particle, thereby breaking it into fragments and/or melting it, and/or vaporizing it. Thus, a dispersion is provided in the form of an expanding debris cloud/plume which spreads the impact energy of the particle over a volume formed by the underlying cellular material, or additional fabric layers which act as additional shocking layers. Each of the insulation layers acts to disperse the energy of hypervelocity debris after fracture.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. An insulation which is resistant to ballistic impact, comprising:

- a first layer of high-strength, ballistic resistant polymeric fabric, the first layer of high-strength polymeric fabric comprises a honeycomb cross-section having a plurality of voids defined by individual honeycomb sections;
- a layer of material having a cellular structure disposed upon said first fabric layer; and,
- a second layer of high-strength polymeric fabric disposed upon said cellular material, and wherein the layer of cellular material infiltrates the fabric layers, and wherein the cellular material infiltrates and fills the voids defined by each individual honeycomb.

2. The insulation of claim 1, wherein the cellular material is selected from the group consisting of close-celled polymer foams, open-celled polymer foams, open-celled aerogels, and open-celled graphitic foams.

3. The insulation of claim 1, further comprising a matrix of cellular material surrounding said first and second fabric layers.

4. The insulation of claim 1, wherein the fabric layers comprise one or more plies of woven polymer fabric.

5. The insulation of claim 4, wherein the first fabric layer is woven of fibers selected from the group consisting of aramids, polyethylenes, and polybenzazoles, and interwoven combinations thereof.

6. The insulation of claim 5, wherein the first fabric layer is capable of absorbing up to about 30,000 fl-lbs of kinetic energy without rupture.

7. The insulation of claim 4, wherein the second fabric layer is woven of fibers selected from the group consisting of aramids, polyethylenes, and polybenzazoles, and interwoven combinations thereof.

8. The insulation of claim 7, wherein the second fabric layer is capable of absorbing up to about 30,000 ft-lbs of kinetic energy without rupture.

9. The insulation of claim 1, further comprising at least one thermal insulation layer wherein the thermal insulation layer comprises a fabric layer having thermal resistance.

10. The insulation of claim 9, wherein the thermal insulation layer is a glass fabric layer.

11. The insulation of claim 1, further comprising a radiation control layer formed of a thin film selected from the group consisting of a thin metal film and an aluminized polyester film.

12. The insulation of claim 1, wherein the relative positioning of the layers and the particular compositions of the ballistic resistant layer and the cellular material is determined by the desired end use of the resulting insulation.

13. The insulation of claim 1, wherein the insulation is resistant to penetration by a fragment having a kinetic energy greater than about 1700 ft-lbs.

14. The insulation of claim 13, wherein the insulation is resistant to penetration by a fragment having a kinetic energy greater than about 3500 ft-lbs.

15. An insulated system comprising

- a container for retaining at least one fluid; and
- an insulation blanket disposed upon at least a portion of said container, said insulation blanket comprising
  - a first layer of high-strength, ballistic resistant polymeric fabric, the first layer of high-strength polymeric fabric comprises a honeycomb cross-section having a plurality of voids defined by individual honeycomb sections;
  - a layer of material having a cellular structure disposed upon said first fabric layer; and,
  - a second layer of high-strength polymeric fabric disposed upon said cellular material, and wherein the layer of cellular material infiltrates the fabric layers, and wherein the cellular material infiltrates and fills the voids defined by each individual honeycomb.

16. The insulated system of claim 15, wherein the container is selected from the group consisting of a fuel tank, a fuel transfer line, a hydraulic tank, and a hydraulic transfer line.

17. The system of claim 15, wherein the container is a hydrazine fuel tank.

18. The system of claim 15, wherein the container is incorporated into the fuel system of a vehicle.

19. The system of claim 15, wherein the container is incorporated into the hydraulic system of a vehicle.

20. The system of claim 15, wherein the insulation is resistant to penetration by a fragment having a kinetic energy greater than about 1700 ft-lbs.

21. The system of claim 20, wherein the insulation is resistant to penetration by a fragment having a kinetic energy greater than about 3500 ft-lbs.

22. An insulated hydrazine fuel tank comprising a container for retaining hydrazine fuel; and an insulation blanket disposed upon at least a portion of said container, said insulation blanket comprising a first layer of high-strength, ballistic resistant polymeric fabric, the first layer of high-strength polymeric fabric comprises a honeycomb cross-section having a plurality of voids defined by individual honeycomb sections;

a layer of material having a cellular structure disposed upon said first fabric layer; and, a second layer of high-strength polymeric fabric disposed upon said cellular material, and wherein the layer of cellular material infiltrates the fabric layers, and wherein the cellular material infiltrates and fills the voids defined by each individual honeycomb.

* * * * *